June 3, 1930. H. JUNKERS 1,761,889
DISCHARGING INSECTICIDES FROM AIRCRAFT
Filed June 17, 1929
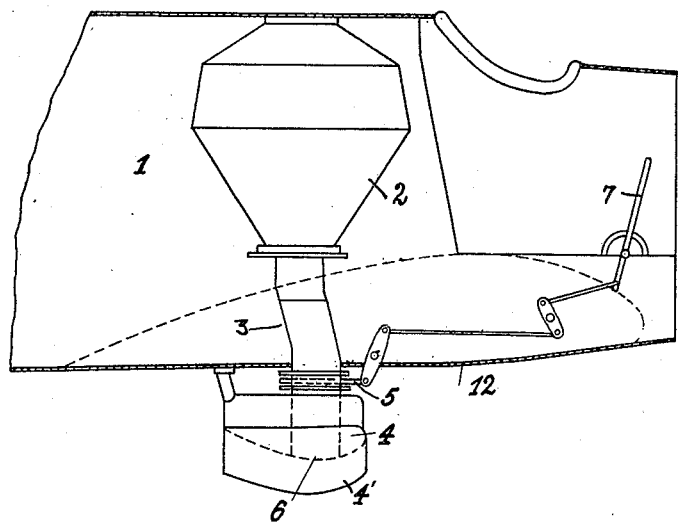
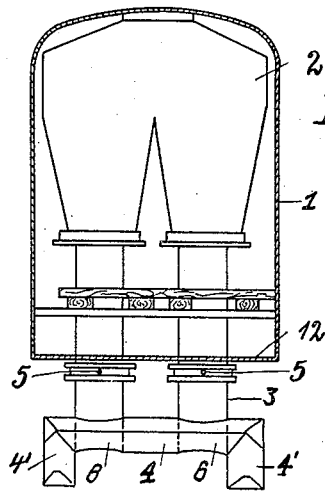
Inventor:
Hugo Junkers Patented June 3, 1930

1,761,889

UNITED STATES PATENT OFFICE

HUGO JUNKERS, OF DESSAU, GERMANY

DISCHARGING INSECTICIDES FROM AIRCRAFT

Application filed June 17, 1929, Serial No. 371,690, and in Germany June 25, 1928.

My invention refers to means for discharging insecticides from aircraft and one of its objects is to provide means for securing a better distribution of the material discharged.

The pipes for discharging vermin-destroying compounds from aircraft generally project beyond the outline of such craft. It has been found that considerable whirling occurs behind the discharge pipes which interferes with the formation of a dense cloud of the pulverulent material.

According to my invention the lower end of the pipe which projects beyond the outline is surrounded by a stream-lined cowl, and the end of the discharge pipe extends into the bottom face of such cowl where suction occurs. In this manner whirls at the opening are eliminated and a compact cloud of dust is obtained at the end of the pipe.

In order to prevent lateral deflection of the material with the formation of whirls, I may provide vertical guide surfaces at the side edges of the cowl which extend downwardly beyond the opening of the pipe.

By these means the air is guided with respect to the discharge pipes so as to prevent dispersion of the cloud of dust before it has attained whirlless regions.

In the drawings affixed to this specification and forming part thereof a device embodying my invention is illustrated diagrammatically by way of example.

In the drawings—

Fig. 1 is a longitudinal section of part of a fuselage, and

Fig. 2 is a cross section viewed from the front, showing a supply tank for the material with two discharge pipes.

Referring to the drawings, 1 is the fuselage, 2 is the supply tank which is designed with a breech pipe as its bottom, and with two discharge pipes 3, the ends of which project beyond the bottom 12 of the fuselage. 4 is a stream-lined cowl secured to the lower ends of the pipes 3. This cowl, as shown in Fig. 1, has aerofoil section, but reversed, with the strongly arched surface down. The openings 6 of the pipes 3 are disposed in the bottom face of the aerofoil where suction prevails. 4' are vertical guide surfaces at the sides of the cowl 4 which extend downwards beyond the openings 6 of the discharge pipes 3.

Means such as slides 5 may be provided for opening and closing the discharge pipes and may be controlled by a handle 7 and suitable linkage.

It will be understood that with the cowl described the air is distributed without the formation of whirls at the rear and at the sides. The cloud of pulverulent material will consequently spread only at the rear of the discharge pipes and will be evenly distributed on the ground.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. In means for discharging insecticides from aircraft having a pipe projecting beyond the outline of said aircraft, the combination with said pipe of a stream-line cowl surrounding the opening of said pipe.

2. In means for discharging insecticides from aircraft having a pipe projecting beyond the outline of said aircraft, the combination with said pipe of a stream-line cowl surrounding the opening of said pipe, said cowl having the shape of an inverted aerofoil.

3. In means for discharging insecticides from aircraft having a pipe projecting beyond the outline of said aircraft, the combination with said pipe of a stream-line cowl surrounding the opening of said pipe, and surfaces at the sides of said cowl which project downwardly from said cowl beyond the opening of said pipe.

4. In means for discharging insecticides from aircraft having a pipe projecting beyond the outline of said aircraft, the combination with said pipe of a stream-line cowl surrounding the opening of said pipe, said cowl being so arranged with respect to said pipe that the opening of said pipe is in the lower surface of said cowl at a point where suction prevails.

5. In means for discharging insecticides from aircraft having a supply tank, a breech pipe at the base of said tank and a discharge pipe in continuation of each branch of said breech pipe, the combination with said discharge pipes of a stream-line cowl surrounding the openings of said pipes.

In testimony whereof I affix my signature

HUGO JUNKERS.